United States Patent
Esken et al.

(10) Patent No.: US 11,760,693 B2
(45) Date of Patent: Sep. 19, 2023

(54) LITHIUM-MIXED OXIDE PARTICLES ENCAPSULATED IN ALUMINUM OXIDE AND TITANIUM DIOXIDE, AND METHOD FOR USING SAME

(71) Applicant: EVONIK OPERATIONS GMBH, Essen (DE)

(72) Inventors: Daniel Esken, Erlensee (DE); Christian Hofmann, Schlüchtern (DE)

(73) Assignee: Evonik Operations GmbH, Essen (DE)

( * ) Notice: Subject to any disclaimer, the term of this patent is extended or adjusted under 35 U.S.C. 154(b) by 788 days.

(21) Appl. No.: 16/486,589

(22) PCT Filed: Feb. 13, 2018

(86) PCT No.: PCT/EP2018/053580
§ 371 (c)(1),
(2) Date: Aug. 16, 2019

(87) PCT Pub. No.: WO2018/149834
PCT Pub. Date: Aug. 23, 2018

(65) Prior Publication Data
US 2020/0010367 A1    Jan. 9, 2020

(30) Foreign Application Priority Data
Feb. 17, 2017    (EP) .................................... 17156693

(51) Int. Cl.
*H01B 1/08*    (2006.01)
*C04B 35/01*    (2006.01)
(Continued)

(52) U.S. Cl.
CPC ............ *C04B 35/01* (2013.01); *C04B 35/628* (2013.01); *C04B 35/62813* (2013.01);
(Continued)

(58) Field of Classification Search
CPC . H01B 1/08; C04B 35/6261; C04B 35/62615; C04B 35/628; H01M 4/04
See application file for complete search history.

(56) References Cited

U.S. PATENT DOCUMENTS

| | | | |
|---|---|---|---|
| 2004/0091779 A1 | 5/2004 | Kang et al. | |
| 2010/0112449 A1* | 5/2010 | Fujita | H01M 4/36 429/231.95 |

(Continued)

FOREIGN PATENT DOCUMENTS

| | | |
|---|---|---|
| CA | 2 373 756 | 11/2000 |
| JP | H05-286708 | 11/1993 |

(Continued)

OTHER PUBLICATIONS

JP 2009-016302 (pub Jan. 22, 2009) English language machine translation.*

(Continued)

*Primary Examiner* — Mark Kopec
(74) *Attorney, Agent, or Firm* — Law Office of: Michael A. Sanzo, LLC

(57) ABSTRACT

Process for producing coated mixed lithium oxide particles, in which mixed lithium oxide particles and a mixture comprising aluminium oxide and titanium dioxide are subjected to dry mixing by means of a mixing unit having a specific power of 0.1-1 kW per kg of mixed lithium oxide particles and mixture used, in total, under shearing conditions.

Coated mixed lithium oxide particles comprising a mixture of aluminium oxide and titanium dioxide as coating material, wherein the aluminium oxide and the titanium dioxide are in the form of aggregated primary particles and the (Continued)

weight ratio of aluminium oxide to titanium dioxide is 10:90-90:10. Battery cell comprising the coated mixed lithium oxide particles.

18 Claims, 1 Drawing Sheet

(51) Int. Cl.
  *C04B 35/628* (2006.01)
  *C04B 40/00* (2006.01)
  *H01M 10/052* (2010.01)
(52) U.S. Cl.
  CPC .... *C04B 35/62821* (2013.01); *C04B 40/0028* (2013.01); *H01B 1/08* (2013.01); *H01M 10/052* (2013.01); *C04B 2235/3203* (2013.01); *C04B 2235/3217* (2013.01); *C04B 2235/3232* (2013.01); *C04B 2235/3262* (2013.01); *C04B 2235/3268* (2013.01); *C04B 2235/3275* (2013.01); *C04B 2235/3279* (2013.01); *C04B 2235/5409* (2013.01)

(56) References Cited

U.S. PATENT DOCUMENTS

| | | | |
|---|---|---|---|
| 2010/0158561 A1 | 6/2010 | Mitsumori et al. | |
| 2013/0175469 A1* | 7/2013 | Paulsen | H01M 4/505 252/182.1 |
| 2015/0340689 A1 | 11/2015 | Song et al. | |
| 2016/0336595 A1* | 11/2016 | Choi | H01M 10/0525 |
| 2020/0185709 A1* | 6/2020 | Zhou | H01M 4/04 |
| 2022/0149368 A1* | 5/2022 | Herzog | H01M 4/366 |

FOREIGN PATENT DOCUMENTS

| | | |
|---|---|---|
| JP | 2009-016302 | 1/2009 |
| JP | 2011-181386 | 9/2011 |
| WO | WO 2005/011044 | 2/2005 |
| WO | WO 2011/031544 | 3/2011 |
| WO | WO 2012/022624 | 2/2012 |
| WO | WO 2014/142803 | 9/2014 |
| WO | WO 2016/196688 | 12/2016 |

OTHER PUBLICATIONS

CN 101694874 (pub Apr. 14, 2010) English language machine translation.*
English language translation of the International Search Report for corresponding PCT/EP2018/053580, filed Feb. 13, 2018.
English language translation of the Written Opinion of the International Searching Authority for corresponding PCT/EP2018/053580, filed Feb. 13, 2018.
English language translation of the International Preliminary Report on Patentability for corresponding PCT/EP2018/053580, filed Feb. 13, 2018.
Examination Report for counterpart Chinese application, CN 201880012071X, with English language comments attached to the front of the document, sent Nov. 24, 2021.
English language machine translation of the description, claims and abstract for CN 101694874, filed Oct. 21, 2009, with original document attached.
English language machine translation of the description, claims and abstract for JP 2009016302, filed Jul. 9, 2007, with original document attached.
U.S. Appl. No. 18/122,709, filed Mar. 17, 2023, Takata.

* cited by examiner

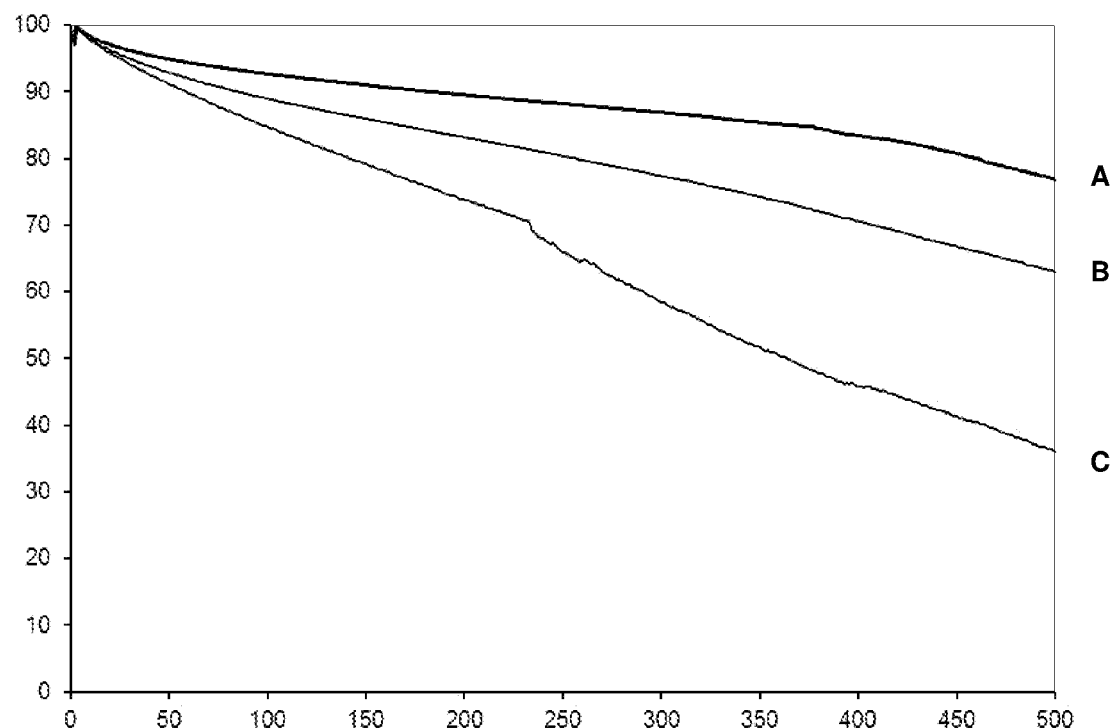

LITHIUM-MIXED OXIDE PARTICLES ENCAPSULATED IN ALUMINUM OXIDE AND TITANIUM DIOXIDE, AND METHOD FOR USING SAME

CROSS REFERENCE TO RELATED APPLICATIONS

The present application is US national stage of international application PCT/EP2018/053580, which had an international filing date of Feb. 13, 2018, and which was published on Aug. 23, 2018. The application claims priority to EP 17156693.8, filed on Feb. 17, 2017.

The invention relates to a process for producing mixed lithium oxide particles coated with aluminium oxide and titanium dioxide. The invention further relates to specific aluminium oxide- and titanium dioxide-coated mixed lithium oxide particles.

It is known that coating of mixed lithium oxide particles with metal oxides can inhibit unwanted reactions of the electrolyte with the electrode materials.

WO2012022624 discloses a process for preparing $(Ni_xMn_yCo_z)_a(Al_2O_3)_b$, with $0.3 \leq x \leq 0.9$, $0 \leq y \leq 0.45$, $0 < z \leq 0.4$, $x+y+z=1$ and $a+2b=1$, $b \leq 0.4$, in which a precursor compound $[Ni_xMn_yCo_z]OOH$ in dry form is contacted with aluminium oxide, for example pyrogenic aluminium oxide, under shearing conditions. This forms a solid coating of aluminium oxide. Subsequent thermal treatment leads to the product.

WO00/70694 discloses mixed lithium oxide particles coated with oxides or mixed oxides of Zr, Al, Zn, Y, Ce, Sn, Ca, Si, Sr, Mg and Ti. They are obtained by suspending the uncoated particles in an organic solvent, admixing the suspension with a solution of a hydrolysable metal compound and a hydrolysis solution, and then filtering off, drying and calcining the coated particles.

There is a similar disclosure in US2004091779. Here, a cathode material of composition $Li_{1+x}Ni_\alpha Mn_\beta Co_\gamma M'_\delta O_{2-z}X_z$ with M'=Mg, Zn, Al, Ga, B, Zr, Ti; X=F, S, Cl, I; $0 < x < 0.333$, $0.2 \leq \alpha \leq 0.6$, $0.2 \leq \beta 0.667$, $0 \leq \gamma \leq 0.333$, $\delta 0.2$, and $0 < z < 0.5$ is coated with one or more oxides of Al, Bi, Ga, Ge, In, Mg, Pb, Si, Sn, Ti, Tl, Zn, Zr.

There is a similar disclosure in WO2011/031544. Here, a cathode material $Li_{1+x}M_{1-x}O_{2-z}F_z$ where M is a metal except for Li and $0.01 < x < 0.3$, $0 < z < 0.2$, is coated with one or more metal oxides of $Al_2O_3$, $Bi_2O_3$, $B_2O_3$, $ZrO_2$, MgO, $Cr_2O_3$, $MgAl_2O_4$, $Ga_2O_3$, $SiO_2$, $SnO_2$, $CaO_2$, SrO, BaO, $TiO_2$, $Fe_2O_3$, $MoO_3$, $MoO_2$, $CeO_2$, $La_2O_3$, ZnO.

WO2014/142803 claims a process for depositing an oxide coating on an inorganic substrate, in which an aqueous composition comprising a tetraalkylammonium polyoxo anion and lithium hydroxide is deposited on the surface of an inorganic substrate and subjected to thermal treatment until the lithium polyoxo anion has been converted to an oxide. The tetraalkylammonium polyoxo anion comprises those of the general formula $AxO_y^{z-}$ where A is a transition metal or a metal or metalloid selected from Al, Si, B, Ga, Ge, As, Sn, Sb, TI, Pb and Bi, or a combination of these, O is an oxygen atom, and the values of x, y and z depend on the valency of A in the polyoxo anion and $y > x$.

US2015340689 discloses an active cathode material having a core of a material capable of intercalating and deintercalating lithium and provides for a coating of nanoscale zirconium oxide and further coating of oxides of Mg, Al, Co, K, Na, Ca, Si, Ti, V, Sn, Ge, Ga, B, As, Zr or a mixture of these.

WO2005011044 discloses a cathode material which is obtained by dry mixing of a mixed lithium oxide with an electrically inactive nanoscale metal oxide, and the metal oxide is selected from the group consisting of $Al_2O_3$, $SiO_2$, MgO, $TiO_2$, $SnO_2$, $B_2O_3$, $Fe_2O_3$, $ZrO_2$ and mixtures of these.

The coating of cathode materials of lithium ion batteries with metal oxides, including mixtures of metal oxides, is known. The coating can reduce unwanted reactions of the electrolyte with the cathode materials. Nevertheless, it remains a challenge to improve these coatings.

The present invention claims a process in which a specific mixture of aluminium oxide and titanium dioxide is used as coating material. Even though the prior art cited includes mixtures of aluminium oxide and titanium dioxide, it does not give any pointers to a process in which a specific mixture is used.

The invention provides a process for producing coated mixed lithium oxide particles, in which mixed lithium oxide particles and a mixture comprising aluminium oxide and titanium dioxide are subjected to dry mixing by means of a mixing unit having a specific power of 0.1-1 kW, preferably 0.2-0.8 kW, per kg of mixed lithium oxide particles and mixture used, in total, under shearing conditions.

Dry mixing is understood to mean that no liquid is used. However, it is possible that there is moisture adhering to the feedstocks or that these include water of crystallization.

If the specific power is less than 0.1 kW per kg of mixed lithium oxide particles and mixture used, in total, this gives an inhomogeneous coating not firmly bonded to the core.

A specific power of more than 1 kW per kg of mixed lithium oxide particles and mixture used, in total, leads to poorer electrochemical properties. In addition, there is the risk that the coating will become brittle and prone to fracture.

The power of the mixing unit can vary between wide limits. Thus, it is possible to use mixing units on the laboratory scale with a power of 0.1-5 kW or mixing units for the production scale with a power of 10-1000 kW.

It is likewise possible to vary the volume of the mixing unit between wide limits. Thus, it is possible to use mixing units on the laboratory scale with a volume of 1-10 l or mixing units for the production scale with a volume of 0.1-2.5 m³.

Preferably, in the process according to the invention, forced mixers are used in the form of intensive mixers with high-speed mixing tools. It has been found that a speed of the mixing tool of 10-30 ms⁻¹, more preferably 15-25 ms⁻¹, gives the best results. Commercially available mixing units are known, for example, as Henschel mixers or Eirich mixers.

The mixing time is preferably 0.1 to 120 minutes, more preferably 0.2 to 60 minutes, very preferably 0.5 to 10 minutes.

The mixing may be followed by a thermal treatment. In the prior art, such a treatment is envisaged in order to bind the coating firmly to the mixed lithium oxide particles. In general, this treatment is unnecessary in the process according to the invention since the mixture of aluminium oxide and titanium dioxide adheres with sufficient firmness on the mixed lithium oxide particles. A preferred embodiment of the process according to the invention therefore does not envisage any thermal treatment after the mixing.

In the context of the invention, a mixture shall be understood to mean a physical mixture in which aluminium oxide particles are present alongside titanium dioxide particles. The mixture may likewise be a mixed oxide in which the mixed oxide components are present in mixed form at the atomic level and may also have Ti—O—Al bonds. It has been found that a physical mixture shows better results with regard to the stability of the coating.

The weight ratio of aluminium oxide to titanium dioxide is preferably chosen at 10:90-90:10 and more preferably 30:70-70:30.

It has been found that the best results with regard to the adhesion on the mixed lithium oxide particles are obtained when the aluminium oxide particles have a BET surface area of more than 50 m$^2$/g, more preferably at least 100 m$^2$/g and most preferably 100-150 m$^2$/g.

The aluminium oxide particles used in the process according to the invention are preferably those that are selected from the group consisting of γ-, θ-, δ-aluminium oxide and mixtures thereof. These aluminium oxide phases lead to good adhesion on the mixed lithium oxide particles. α-Aluminium oxide particles, by contrast, give worse results. The aluminium oxide phases may, if they are present in the form of a mixture, take the form of mutually firmly fused phases within a particle.

In the process according to the invention, the mixture comprises not only aluminium oxide particles but also titanium dioxide particles. The BET surface area of the titanium dioxide particles used is preferably at least 40 m$^2$/g, more preferably from 40 to 100 m$^2$/g.

Preferably, the BET surface area of the aluminium oxide particles used is greater than that of the titanium dioxide particles used.

In a particular embodiment of the process according to the invention, at least one of the types of particle, aluminium oxide particles or titanium dioxide particles, are in the form of aggregated primary particles. More preferably, aluminium oxide particles and titanium dioxide particles that are both in the form of aggregated primary particles are used.

These aggregated primary particles may especially be obtained by pyrogenic methods. "Pyrogenic" shall be understood here to mean the hydrolysis of compounds of aluminium or titanium in a flame produced by the reaction of a fuel gas, preferably hydrogen and oxygen. This at first forms primary particles that are highly dispersed and non-porous, which fuse to form aggregates later in the reaction, and these cluster further to give agglomerates. While the aggregates are firmly fused to one another, the agglomerates can be entirely or partly broken into aggregates under shearing conditions.

The diameter of the primary particles can be estimated from the BET surface area and, in the case of the pyrogenic particles, is about 10-25 nm. The diameter of the aggregates is about 50-1000 nm, the diameter of the agglomerates 1-2 μm.

The surfaces of the particles have hydroxyl groups. The particles thus produced have a purity of at least 99.5% by weight, generally at least 99.8% by weight. Commercially available pyrogenic powders that are in the form of aggregated particles are, for example, AEROXIDE® Alu 65, AEROXIDE® Alu C, AEROXIDE® Alu 130, AEROXIDE® TiO2 P25 and AEROXIDE® P90, all from Evonik Resource Efficiency GmbH.

The mixed lithium oxide used with preference in the process according to the invention is selected from the group consisting of lithium-cobalt oxides, lithium-nickel-manganese-cobalt oxides, lithium-nickel-cobalt-aluminium oxides, lithium-manganese oxides, lithium-nickel-manganese oxides, or a mixture of these.

The proportion of (aluminium oxide+titanium dioxide) is preferably 0.05%-5% by weight and more preferably 0.1%-2% by weight, based in each case on the sum total of mixed lithium oxide particles and (aluminium oxide+titanium dioxide). If the proportion is less than 0.05% by weight, complete coating of the mixed lithium oxide particles is not assured. In the case of more than 5% by weight, no additional effect is observed.

The present invention further provides coated mixed lithium oxide particles obtainable by the process according to the invention.

The invention further provides coated mixed lithium oxide particles comprising a mixture of aluminium oxide and titanium dioxide as coating material, wherein the aluminium oxide and the titanium dioxide are in the form of aggregated primary particles and the weight ratio of aluminium oxide to titanium dioxide is 10:90-90:10, preferably 30:70-70:30.

The coated mixed lithium oxide particles preferably have a diameter of 2-20 μm and the coating has a thickness of 50-500 nm.

Finally, the invention also provides a battery cell comprising the coated mixed lithium oxide particles.

EXAMPLES

Feedstocks

AEROXIDE® Alu 130, BET surface area 130±20 m$^2$/g; Al$_2$O$_3$ content≥99.8% by weight.
AEROXIDE® TiO2 P25, BET surface area 50±15 m$^2$/g; TiO$_2$ content≥99.5% by weight, both Evonik Resource Efficiency GmbH.
Lithium cobalt oxide powder, LCO LC412; mean diameter d$_{50}$=11±2 μm (via laser diffraction), BET surface area<0.5 m$^2$/g; Gelon.

Example 5 g of AEROXIDE® Alu 130 and 5 g of AEROXIDE® TiO2 P25 are blended with low energy input. To this mixture are added 990 g of LCO LC412 and then the mixture is mixed in an intensive laboratory mixer with a power of 0.25 kW over a period of 1 min.

Specific power=0.25 kW/kg; specific energy=0.042 kWh/kg=15 kJ/kg.

Proportion of (aluminium oxide+titanium dioxide)=1% by weight

Speed of mixing tool 22 ms$^{-1}$.

An coated LCO powder having a layer thickness of 100-200 nm is obtained.

The attached drawing shows the effect of the coating on the cell capacity as a function of the number of cycles.

This compares (A) LCO powder coated by the process according to the invention with a 50:50 mixture of AEROXIDE® Alu 130 and AEROXIDE® TiO2 P25 with (B) LCO powder coated with AEROXIDE® Alu 130 only and (C) non-coated LCO powder.

The axes show: x axis=number of cycles; y axis=normalized cell capacity in %;

Charging switch-off voltage=4.4 V; temperature=45° C.

(A) shows a higher cell capacity over the entire cycling range.

It is known that the cycling of cells gives rise to breakdown products that can increase the internal resistance of the cell and also the temperature thereof. The DCIR value should therefore be very low and relatively stable over hundreds of cycles. In the case of uncoated LCO and Al$_2$O$_3$-coated LCO, it seems that a layer which is always less permeable to the current grows around the active cathode material, which is manifested in a higher DCIR.

The table shows that this effect is much less marked in the case of the mixed lithium oxide particles that have been coated in accordance with the invention.

TABLE

Internal resistance (DCIR*) in ohm · cm$^2$ of the electrochemical cell with/without coating

| Sample | 3rd cycle | 450th cycle |
|---|---|---|
| LCO LC412 | 15.4 | 96.6 |
| AEROXIDE ® Alu 130 + LCO LC412 | 17.7 | 92.6 |
| AEROXIDE ® Alu 130 + TiO2 P25 + LCO LC412 | 8.0 | 18.7 |

*direct current internal resistance; pouch full-cell tests; voltage range: 3.0-4.4 V; temperature: 45° C.; forming at 0.02 C/0.3 C; cycling at 1 C/1 C; electrode size: 25 cm$^2$

The invention claimed is:

1. A process for producing coated mixed lithium oxide particles, comprising dry mixing: a) mixed lithium oxide particles, and b) a mixture comprising aluminium oxide and titanium dioxide; using a mixing unit having a specific power of 0.1-1 kW per kg of mixed lithium oxide particles and mixture used, in total, under shearing conditions; and wherein there is not a thermal treatment after mixing.

2. The process of claim 1, wherein the aluminium oxide and/or the titanium dioxide is in the form of aggregated primary particles.

3. The process of claim 2, wherein the aggregated primary particles are formed by pyrogenic means.

4. The process of claim 3, wherein:
a) the weight ratio of aluminium oxide to titanium dioxide is 10:90-90:10;
b) aluminium oxide particles having a BET surface area of at least 115 m2/g are used;
c) the proportion of (aluminium oxide+titanium dioxide) is 0.05%-5% by weight, based on the sum total of mixed lithium oxide particles and (aluminium oxide+titanium dioxide).

5. The process of claim 4, wherein the mixed lithium oxide particles are selected from the group consisting of lithium-cobalt oxides, lithium-nickel-manganese-cobalt oxides, lithium-nickel-cobalt-aluminium oxides, lithium-manganese oxides, lithium-nickel-manganese oxides, or a mixture of these.

6. The process of claim 1, wherein the weight ratio of aluminium oxide to titanium dioxide is 10:90-90:10.

7. The process of claim 6, wherein the aluminium oxide particles and titanium dioxide particles are each in the form of aggregated primary particles.

8. The process of claim 7, wherein the mixed lithium oxide particles are selected from the group consisting of lithium-cobalt oxides, lithium-nickel-manganese-cobalt oxides, lithium-nickel-cobalt-aluminium oxides, lithium-manganese oxides, lithium-nickel-manganese oxides, or a mixture of these.

9. The process of claim 8, wherein the proportion of (aluminium oxide+titanium dioxide) is 0.05%-5% by weight, based on the sum total of mixed lithium oxide particles and (aluminium oxide+titanium dioxide).

10. The process of claim 1, wherein aluminium oxide particles having a BET surface area of at least 115 m$^2$/g are used.

11. The process of claim 1, wherein the aluminium oxide particles are selected from the group consisting of γ-, θ-, δ-aluminium oxide and mixtures of these.

12. The process of claim 1, wherein titanium dioxide particles having a BET surface area of at least 40 m$^2$/g are used.

13. The process of claim 1, wherein the BET surface area of the aluminium oxide particles used is greater than that of the titanium dioxide particles used.

14. The process of claim 1, wherein the aluminium oxide particles and titanium dioxide particles are each in the form of aggregated primary particles.

15. The process of claim 1, wherein the mixed lithium oxide particles are selected from the group consisting of lithium-cobalt oxides, lithium-nickel-manganese-cobalt oxides, lithium-nickel-cobalt-aluminium oxides, lithium-manganese oxides, lithium-nickel-manganese oxides, or a mixture of these.

16. The process of claim 1, wherein the proportion of (aluminium oxide+titanium dioxide) is 0.05%-5% by weight, based on the sum total of mixed lithium oxide particles and (aluminium oxide+titanium dioxide).

17. The process of claim 16, wherein the aluminium oxide particles are selected from the group consisting of γ-, θ-, δ-aluminium oxide and mixtures of these.

18. The process of claim 17, wherein the aluminium oxide particles and titanium dioxide particles are each in the form of aggregated primary particles.

* * * * *